United States Patent
Keck

[11] 3,838,621
[45] Oct. 1, 1974

[54] APPARATUS FOR CUTTING CLAY AND OTHER PLASTIC MATERIAL

[75] Inventor: Dieter Keck, Laggenbeck/Westfalia, Germany

[73] Assignee: C. Keller u. Co., Laggenbeck/Westfalia, Germany

[22] Filed: Apr. 11, 1973

[21] Appl. No.: 350,202

[30] Foreign Application Priority Data
Apr. 26, 1972  Germany.......................... 2220360

[52] U.S. Cl....................... 83/401, 83/567, 83/599, 83/607, 83/651.1
[51] Int. Cl............................................ B28b 11/14
[58] Field of Search ............ 83/607, 608, 609, 564, 83/435, 435.2, 425.3, 651.1, 599, 401

[56] References Cited
UNITED STATES PATENTS
| | | | |
|---|---|---|---|
| 477,915 | 6/1892 | Snell .............................. | 83/425.3 X |
| 496,982 | 5/1893 | Snell .............................. | 83/607 X |
| 3,197,530 | 7/1965 | Miller et al. ...................... | 83/435 X |

Primary Examiner—J. M. Meister
Attorney, Agent, or Firm—Mason, Mason & Albright

[57] ABSTRACT

Apparatus for cutting a block of clay into brick-shaped elements comprises a conveyor in the form of laterally-spaced conveyor bands. A frame is pivotal with respect to the conveyor and carries a plurality of laterally-spaced cutter wires, the frame being pivotal from a raised position to a lowered position to cut a block carried by the conveyor. When the frame is in its lowered position, the cutter wires lie between the conveyor bands whereby the cut block can be transported for further processing without damage being caused to the block by the wires.

2 Claims, 4 Drawing Figures

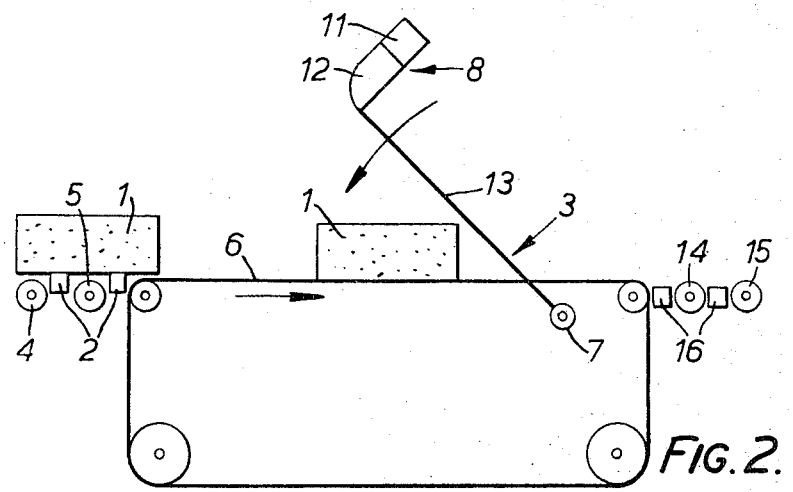
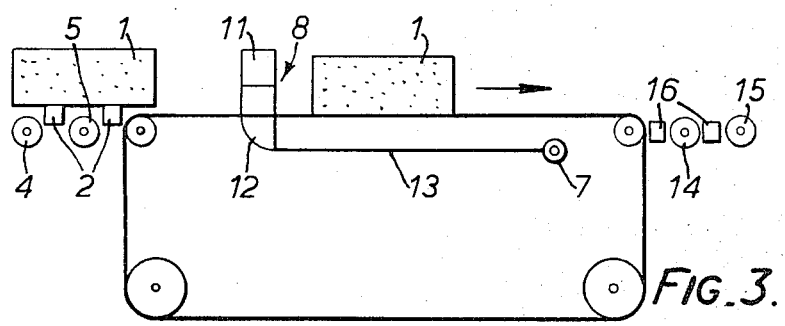
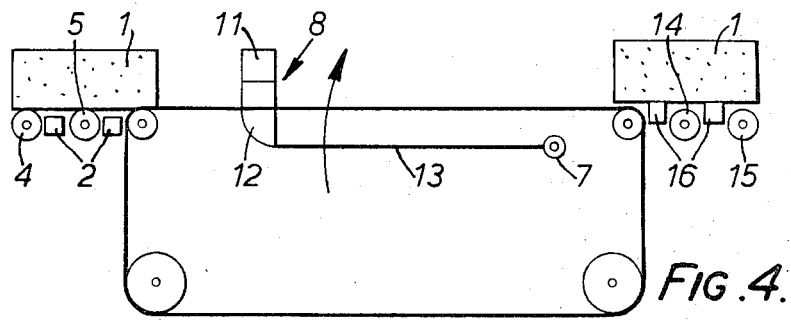

APPARATUS FOR CUTTING CLAY AND OTHER PLASTIC MATERIAL

BACKGROUND OF THE INVENTION

1. Field of the Invention

The present invention relates to apparatus for cutting plastic material, for example clay.

2. Description of the Prior Art

Apparatus for the production of brick-shaped elements from a clay block has been proposed in which the block is moved by a conveying device in the form of separate plates which are spaced from each other. A cutting frame which is pivotal in bearings and is provided with a number of spaced cutting wires is arranged laterally to the conveying device. A pusher slides the block towards the cutting frame which is then pivoted so that the cutting wires cut the block into individual brick-shaped elements. The pusher continues to push the cut block into the range of another pusher which effects further conveyance of the cut block while the first pusher is returned into its initial position.

This previously proposed apparatus adversely affects the surface finish of the brick-shaped elements, since two pushers grasp the block at its rear face and thereby damage this face.

Damage which causes breaking of the edges occurs as a result of the considerable friction at the underside of the block when in contact with the conveying device. The first pusher moreover obviates an efficient and rapid sequence of operations and thus a high productive capacity, since it operates in a plane which is parallel to a block feed device whereby the feed device is prevented from bringing up a further block until the pusher has returned to its initial position.

SUMMARY OF THE INVENTION

According to the present invention there is provided in apparatus for cutting plastic material conveying means operative to convey a block of plastic material through the apparatus, said conveying means comprising laterally spaced conveyor bands, and cutter means operative to cut the block into brick-shaped elements, said cutter means comprising a pivotal frame, and laterally spaced cutter wire means carried by the frame, said cutter wire means being located between said conveyor bands after pivotal movement of the frame in a sense to cause the wire means to cut the block.

BRIEF DESCRIPTION OF THE DRAWINGS

An embodiment of the invention will now be described, by way of example only, with reference to the accompanying drawings, in which:

FIGS. 2 to 4 are side elevations illustrating the sequence of operations effected in the apparatus.

DESCRIPTION OF THE PREFERRED EMBODIMENT

Figure 1:
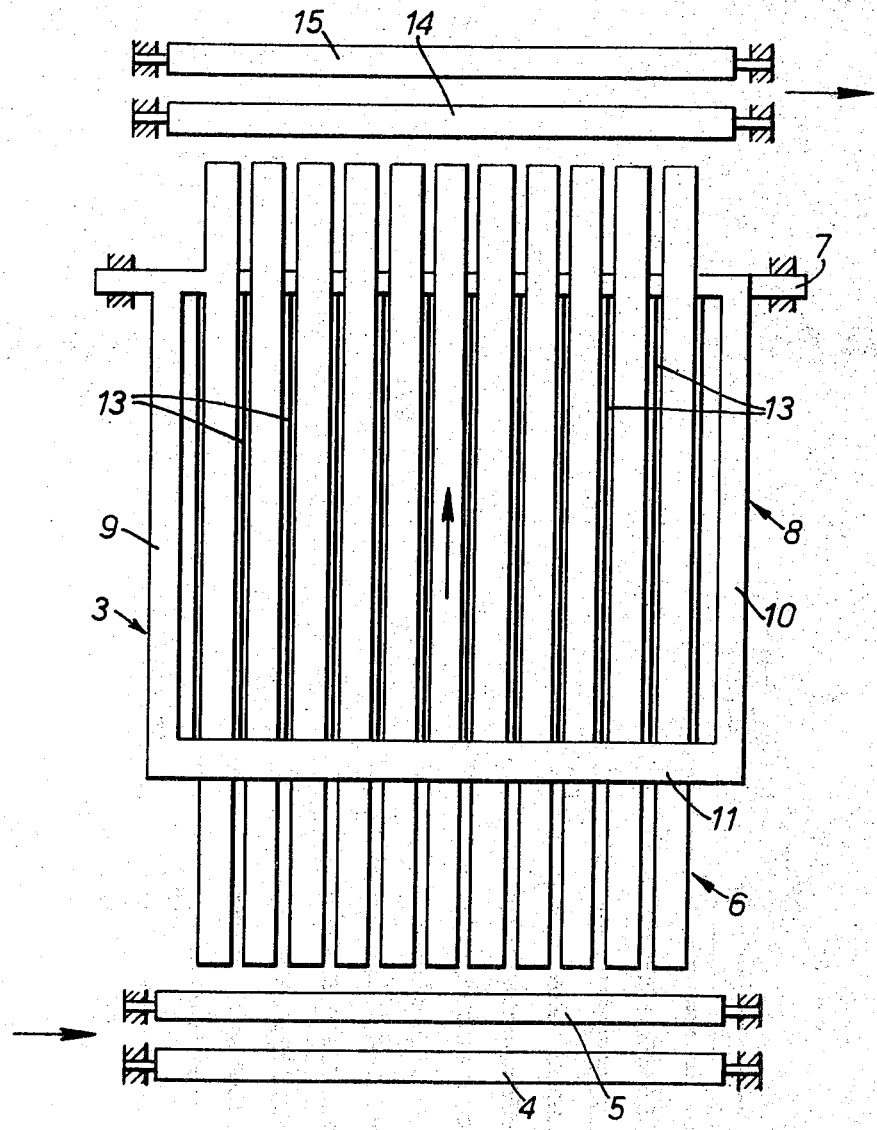
FIG. 1 is a plan view of cutting apparatus in accordance with the invention.

A clay block 1 which is cut from bar-like clay strip to a given length is delivered onto conveying bands 2 adjacent a cutting device 3. By lowering the conveying bands 2 below the level of rollers 4 and 5, arranged alternatively between the conveying bands 2, the block 1 is transferred onto the rollers 4 and 5 as shown in FIG. 4.

The rollers 4 and 5 are then activated and convey the block 1 onto individual, laterally-spaced, conveying bands 6 which advance the block 1 in the direction of the arrow towards a cutting frame 8 of the cutting device.

The cutting frame 8 is mounted on a shaft 7 arranged below the conveying bands 6 and comprises two parallel bars 9 and 10 rigid with the shaft 7 and a cross bar 11 connected to the bars 9 and 10. The cross bar 11 is provided with a number of nose portions 12 which extend in the direction of the arriving block 1. The nose portions 12 are laterally spaced and an indentical number of cutting wires 13 are fixed in the cutting frame 8, the cutting wires 13 being guided over the nose portions 12 in such a way that they extend into the gaps between the conveying bands 6 and are located below the conveying bands 6 when the frame 8 is in a lowered position as shown in FIGS. 3 and 4.

As soon as the block 1 arrives within the range of the cutting frame 8, the latter is lowered from its raised position shown in FIG. 2 so that the cutting wires 13 cut up the block 1 into separate brick-shaped elements.

After this operation the cutting wires 13 remain for a short time below the conveying bands 6 until the brick-shaped elements have been moved beyond the cutting frame 8 and onto rollers 14 and 15 located adjacent the end of the upper run of the conveying bands 6. Conveying bands 16 are arranged between the rollers 14 and 15 and lift the brick-shaped elements from the rollers 14 and 15 and convey them to another processing station (FIG. 4).

After the brick-shaped elements have been removed from the rollers 14 and 15, the cutting frame 8 is raised into the position shown in FIG. 2, to cut a further block which is supplied by the bands 2.

In the apparatus particularly described, the absence of pushers or sliding guides enables brick-shaped elements to be produced which are free from damage. Further, the apparatus described has constructional simplicity, reliability in operation, and a comparatively high output.

What is claimed is:

1. In apparatus for cutting a block of clay into brick-shaped elements
   conveying means operative to convey a block of clay through the apparatus, said conveying means comprising
   a plurality of laterally spaced endless conveyor bands, and
   cutter means operative to cut the block into brick-shaped elements, said cutter means comprising
   a pivotal frame, and
   laterally spaced cutter wire means carried by the frame, said cutter wire means being located between said conveyor bands after pivotal movement of the frame in a sense to cause the wire means to cut through the block.

2. Apparatus as claimed in claim 1, wherein the frame comprises
   a cross-bar extending laterally with respect to the conveyor bands, said cross-bar defining an upstream edge of the frame, and
   nose means, said nose means being mounted on the cross-bar in alignment with the wire means, and said wire means being guided over the nose means.

\* \* \* \* \*